(12) United States Patent
Hoeben et al.

(10) Patent No.: US 11,876,844 B2
(45) Date of Patent: Jan. 16, 2024

(54) SYSTEMS AND METHODS OF ALTERNATIVE NETWORKED APPLICATION SERVICES FOR VIDEO-CONFERENCING APPLICATIONS

(71) Applicant: ACTIVEVIDEO NETWORKS, INC., San Jose, CA (US)

(72) Inventors: Maarten Hoeben, Acquapendente (IT); Ronald A. Brockmann, Los Gatos, CA (US)

(73) Assignee: Active Video Networks, Inc., San Jose, CA (US)

( * ) Notice: Subject to any disclaimer, the term of this patent is extended or adjusted under 35 U.S.C. 154(b) by 0 days.

(21) Appl. No.: 17/711,955

(22) Filed: Apr. 1, 2022

(65) Prior Publication Data
US 2022/0321618 A1 Oct. 6, 2022

Related U.S. Application Data

(63) Continuation of application No. PCT/US2022/022272, filed on Mar. 29, 2022.

(60) Provisional application No. 63/169,513, filed on Apr. 1, 2021.

(51) Int. Cl.
*H04L 65/403* (2022.01)
*H04L 65/1083* (2022.01)

(52) U.S. Cl.
CPC ........ *H04L 65/403* (2013.01); *H04L 65/1083* (2013.01)

(58) Field of Classification Search
CPC ... H04L 65/756; H04L 65/403; H04L 65/762; H04L 65/1083; H04N 7/15; H04N 7/147; H04N 21/2355

USPC ............................................ 348/14.01–14.16
See application file for complete search history.

(56) References Cited

U.S. PATENT DOCUMENTS

| | | | |
|---|---|---|---|
| 2007/0211141 A1* | 9/2007 | Christiansen | H04L 65/80 348/E7.083 |
| 2011/0138069 A1* | 6/2011 | Momchilov | H04L 65/765 709/231 |
| 2011/0279638 A1* | 11/2011 | Periyannan | H04N 7/141 348/14.09 |

(Continued)

FOREIGN PATENT DOCUMENTS

WO  WO-2006115591 A1 * 11/2006  ......... H04L 65/1083

OTHER PUBLICATIONS

Spotify AB, International Search Report and Written Opinion, PCT/US2022/022272, dated Jul. 27, 2022, 16 pgs.

*Primary Examiner* — Melur Ramakrishnaiah
(74) *Attorney, Agent, or Firm* — Morgan, Lewis & Bockius LLP

(57) ABSTRACT

The server system hosts one or more virtual client devices executing one or more virtual applications, each virtual client device corresponding to a remote physical client device. The server system receives, from a first remote physical client device, a signal of a characteristic of media detected by a physical component of the first remote physical client device. The server system, in response to receiving the signal of the characteristic of the media, determines, based on the characteristic of the media, an instruction for adjusting the media detected by the physical component of the first remote physical client device and transmits, to the client device, the instruction for adjusting the media at the first remote physical client device.

17 Claims, 8 Drawing Sheets

(56) References Cited

U.S. PATENT DOCUMENTS

2012/0236111 A1\* 9/2012 Halavy ................. H04N 7/152
                                                    348/14.09
2019/0287306 A1\* 9/2019 Wieser .................... H04N 7/15

\* cited by examiner

SYSTEMS AND METHODS OF ALTERNATIVE NETWORKED APPLICATION SERVICES FOR VIDEO-CONFERENCING APPLICATIONS

RELATED APPLICATIONS

This application is a continuation of International Patent Application PCT/US22/22272, entitled "Systems and Methods of Alternative Networked Application Services for Video-conferencing Applications," filed on Mar. 29, 2022, which claims priority to U.S. Provisional Patent Application No. 63/169,513, entitled "Systems and Methods of Alternative Networked Application Services for Video-conferencing Applications," filed on Apr. 1, 2021, each of which are hereby incorporated by reference in their entirety.

This application is a related to U.S. Provisional Application No. 63/152,277, titled "Systems and Methods of Alternative Networked Application Services," filed on Feb. 22, 2021, which is hereby incorporated by reference in its entirety. This application is also related to U.S. patent application Ser. No. 16/890,957, titled "Orchestrated Control for Displaying Media," filed on Jun. 2, 2020, which claims priority to U.S. Provisional Application No. 62/868,310, filed on Jun. 28, 2019, each of which is hereby incorporated by reference in its entirety. This application is also related to U.S. patent application Ser. No. 16/721,125, titled "Systems and Methods of Orchestrated Networked Application Services," filed on Dec. 19, 2019, which is a continuation of International Application No. PCT/US18/40118, filed Jun. 28, 2018, which claims priority to U.S. Provisional Application No. 62/526,954, filed Jun. 29, 2017, each of which is hereby incorporated by reference in their entirety.

FIELD OF ART

The present invention relates generally to controlling display of media by a client, and more particularly to virtualizing a video conferencing application at a server remote from a client device.

BACKGROUND

Many new interactive video-conferencing services are now delivered by way of the Internet. Typically, these new services interact with a common web browser on a laptop, tablet, or smartphone or require a third-party application to run on a dedicated client device, such as a third-party Internet set-top box or smart TV. There is a need to interact with these services while reducing reliance on specialized client devices. However, relative to a common web browser or third-party application on a laptop, tablet or smartphone, generic legacy TV set-top boxes have limited resources in terms of processing power, graphical capabilities and memory, and are typically not able to support most of these new interactive video-conferencing services due to such limitations.

Moreover, additional video and audio communication services, like video-conferencing, typically require dedicated applications running on desktop computers, laptops, tablets, or smartphones that have full computing capabilities. These days, however, as more and more devices are connected to the Internet, electronic devices that traditionally could not handle video and audio communication services are beginning to do so. Adding full computing capabilities and memory for storing and running multiple applications is expensive, and adds significant cost to these devices, which make them less competitive. As such, it is desirable to provide a system and method for providing full application services to client devices that do not have the available resources to store and run all of the applications and services available to them.

SUMMARY

Some embodiments of the present disclosure provide a virtualized application service system in which interactive video-conferencing services provided by applications running on a server. Virtualizing these interactive video-conference applications on the server allows thin-client devices, including legacy set-top boxes, to appear as though the interactive applications are running locally. The present disclosure provides solutions to numerous problems that arise in the context of virtualizing application services for interactive video-conferencing applications, such as the fact that transmitting video and audio data to a virtualized video-conferencing application would ordinarily result in unacceptable latencies for video-conferencing purposes. Together, these embodiments improve user experience and improve the efficiency of the server-client system by reducing bandwidth and memory requirements.

In accordance with some embodiments, a method is performed at a server computing device for remotely processing media for a video-conferencing application. The server system hosts one or more virtual client devices, each associated with a respective physical client device. The method comprises receiving, from a first remote physical client device, a signal of a characteristic of media detected by a physical component of the first remote physical client device. The method comprises, in response to receiving the signal of the characteristic of the media, determining, based on the characteristic of the media, an instruction for adjusting the media detected by the physical component of the first remote physical client device. The method further comprises transmitting, to the client device, the instruction for adjusting the media at the first remote physical client device.

In some embodiments, a computer readable storage medium storing one or more programs for execution by one or more processors of an electronic device is provided. The one or more programs include instructions for performing any of the methods described above.

In some embodiments, an electronic device (e.g., a server system) is provided. The server system comprises one or more processors and memory storing one or more programs for execution by the one or more processors, the one or more programs including instructions for performing any of the methods described above.

It will be recognized that, in various embodiments, operations described with regard to the client may apply to a server and vice versa.

DETAILED DESCRIPTION

In accordance with some embodiments, computer systems provide an environment for third-party applications in which applications can run unmodified in a server environment in the third-party's domain (e.g., in a manner that is transparent to third-party applications that run on a client device).

Various embodiments described herein are directed to improvements of application server systems. In such systems, the user interacts with various interactive TV and VOD applications, and/or video-conferencing applications remotely: with the user's interactions sent to a server system and video images transmitted back to the user's device. In this way, the user perceives the application as though it were running locally on the user's device.

In some embodiments, the applications (e.g., including video-conferencing applications) include user interface elements rendered via a graphics API (e.g., OpenGL) with full-screen video and/or partial screen video (e.g., managed via a video playback API such as OpenMAX and/or managed via video decoding and rendering Android APIs). The applications are meant to be ported, installed and run locally on the client device. Instead, in some embodiments, methods are provided for running the application as, or similar to, unmodified Virtual Client Virtual Machines (VCVM) (e.g., and/or as containers) running on application servers in a different domain than the client's or central facility's domain. By virtualizing the used APIs, such as OpenGL and OpenMAX, application functionality can be separated from the rendering functionality.

Various embodiments of a remote virtualization system and process that enables users of a plurality of various client devices to interact with video and graphic-rich interactive applications running in a remote server environment are provided. The resulting user experience is essentially equivalent to running these applications on the local client device, even when these devices require access to remote server resources such as various graphics rendering and other resources.

Figure 1:
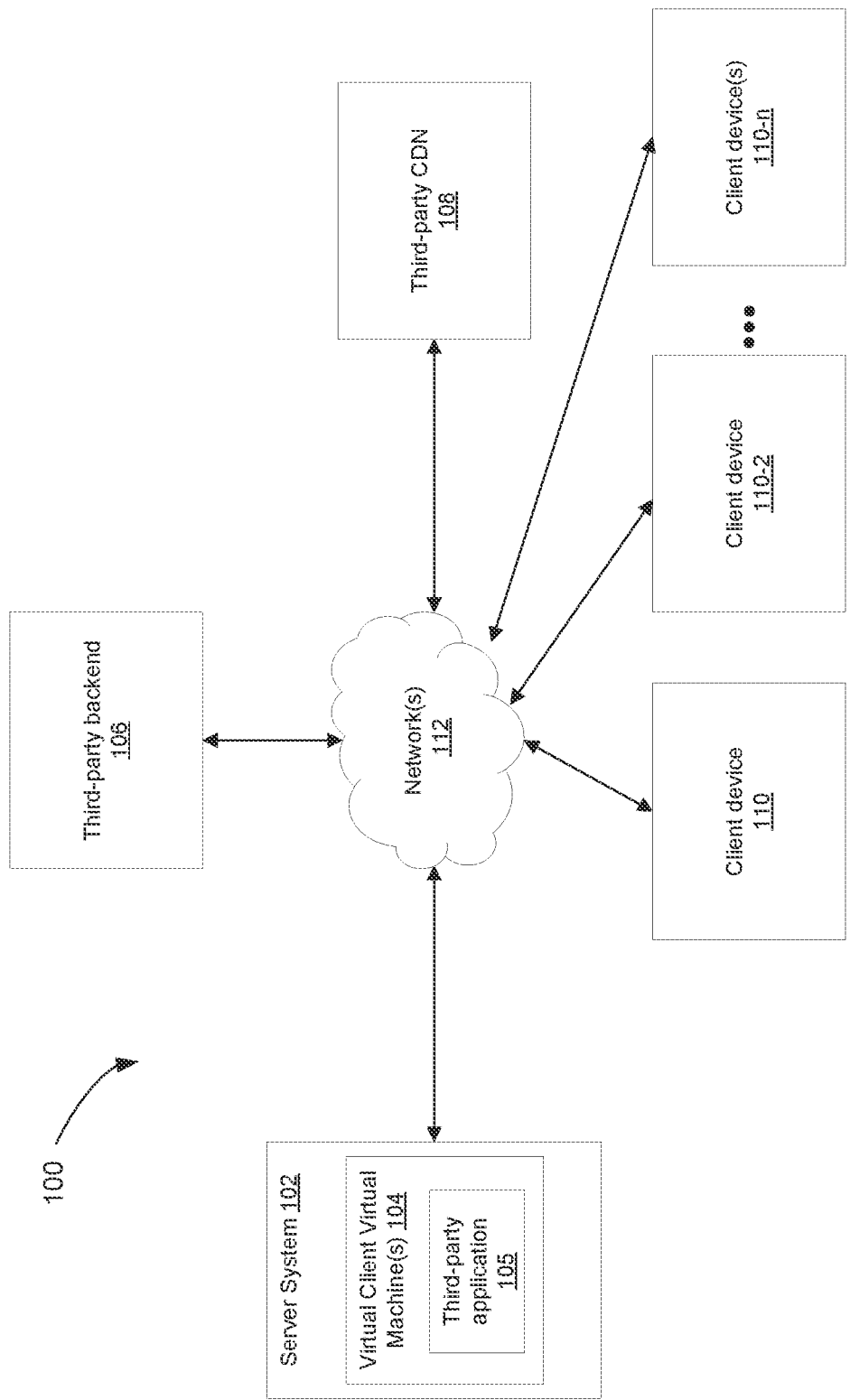
FIG. 1 is a top-level diagram illustrating a content delivery system, in accordance with some embodiments.

FIG. 1 is a top-level diagram illustrating a content delivery system, in accordance with some embodiments. System 100 includes server system 102 that is hosting one or more virtual client virtual machines (VCVM(s)) 104. Each VCVM executes one or more third-party application(s) 105. System 100 further includes third-party backend 106, third-party content distribution network (CDN) 108, and client device 110. Server system 102, third-party backend 106, third-party CDN 108, and client device 110 communicate with each other via one or more network(s) 112.

In some embodiments, a respective VCVM 104 (e.g., a Linux container) is associated with one or more client devices 110 (e.g., client device 110, client device 1102, client device 110-n). In some embodiments, the third-party application 105 and the third-party CDN 108 are associated with the same media providing service. In some embodiments, the third-party application 105 is configured to control playback of content provided by the third-party CDN 108 (e.g., the third-party application 105 is a virtualized application that would normally be executed on the client device 110). For example, the client device 110 displays content provided by third-party CDN 108 while the third-party application 105 is executing on VCVM 104. In this way, client device 110 offloads execution of the third-party application to the server system 102, reducing the processing power and/or memory required by the client device 110. As such, instead of client device 110 controlling playback of media content that is retrieved from third-party CDN 108, server system 102 controls playback by issuing playback commands to client device 110.

In some embodiments, third-party backend 106 stores third-party backend data. In some embodiments, third-party backend 106 is in communication (e.g., via network(s) 112) with the third-party application 105 that is executing on virtual client virtual machine (VCVM) 104. In some embodiments, a plurality of third-party applications 105 (e.g., each third-party application associated with a content provider) execute on a same VCVM (e.g., a user is provided access to a plurality of third-applications that are executed on VCVM 104).

In some embodiments, third-party backend 106 receives requests (e.g., from third-party application 105 executing on VCVM 104) and issues responses in accordance with third-party backend data. For example, the user selects a title from the user interface to watch, and in response to the selection, the third-party application 105 queries either the backend 106 or the CDN 108 to find out how to get the actual media content. In response to the query, third-party backend 106 performs a lookup to determine where (e.g., a directory or server) the first media content item is stored, and third-party backend 106 issues a response to the third-party application 105 that identifies where to retrieve the first media content item from the identified location of storage (e.g., at third-party CDN 108). Using this information, the third-party application 105 uses the network API to download the media content. In some embodiments third-party backend 106 receives other types of queries (e.g., queries that do not require obtaining media assets, such as to initiate or end a user session). For example, third-party backend 106 issues responses to third-party application 105 upon receiving requests for user authentication, user profile information, recently viewed content, and/or identification of content (e.g., content catalogues) that are available to the user.

In some embodiments, third-party CDN 108 (and/or third-party backend 106) stores third-party content, including media content such as video assets and/or image assets. A media asset may contain a single representation for either audio or video, or combinations of various representations of audio and video. In some embodiments, a media asset includes a single representation of audio and a single representation of video in separate assets so the third-party application can select and request a respective asset that is applicable for the current conditions (e.g., bitrate) and/or based on user preference (e.g., audio in a certain language). Each media asset (e.g., audio and/or video asset) may be subdivided in multiple segments (e.g., referred to herein as media stream segments) that can be individually and progressively downloaded from the CDN 108. In some embodiments, as explained above, the third-party backend 106 issues a response to the third-party application 105 (e.g., or a third-party application proxy at the server system), and the third-party application 105 forwards instructions (e.g., the command) to client 110 (e.g., to retrieve the first media content item (e.g., media assets for the first media content item) from third-party CDN 108) and/or executes the command at the third-party application 105. In order for server system 102 to accurately control playback of media content at client device 110, server system 102 needs information about how much of the media asset the client device 110 has retrieved (e.g., which media stream segments the client device has retrieved) from CDN 108 (e.g., and/or current playback information regarding what the client device is currently playing back). In addition, one goal in virtualizing third-party application 105 is to avoid the need to modify third-party application 105 as compared to a version of the application that would run on client device 110. Often, applications that control presentation of video and other media content are configured to have access to the video or other media content. But, having been virtualized, it would be extremely inefficient to send the video or other media content to both the server system 102 and the client device 110 (where it is ultimately displayed).

Accordingly, in some embodiments, upon receiving a media stream segment (e.g., corresponding to a portion of the media asset from third-party CDN 108 or a media asset from third-party backend 106), client device 110 generates a digest of the media stream segment (e.g., a file that includes information, such as metadata, from the media stream segment, but from which video/image content from the media stream segment has been removed or discarded, as described with reference to FIG. 2) and sends the digest to server system 102. The digest includes identifying information (e.g., header information, number of frames, etc.) about the media stream segment the client device 110 retrieved from CDN 108. Thus, server system 102 (e.g., and VCVM 104) receives the identifying information in the digest, processes the identifying information to generate a reconstructed media stream (e.g., by adding dummy video data), and provides the reconstructed media stream to third-party application 105 executing on VCVM 104. Third-party application recognizes the reconstructed media stream (e.g., is "tricked" into processing the reconstructed media stream as if it were the original media stream retrieved from CDN 108 or backend 106), and issues a playback command to initiate playback of the media stream segment (e.g., after the application confirms that the full media stream segment has been retrieved). The command to initiate playback is transmitted from third-party application 105 to client device 110.

In response to receiving the command to initiate playback, client device 110 displays the unmodified media stream segment that was retrieved (e.g., downloaded) from CDN 108 or backend 106. Thus, client device 110 displays original content from CDN 108 or backend 106 based on a playback command controlled by the third-party application 105 executing on the server system 102. In some embodiments, third-party application 105 that is executing on the server system does not receive the original (e.g., unmodified) content from the CDN. Instead, third-party application 105 processes a segment reconstructed from the digest (e.g., a media stream segment without the video data) and issues the playback command based on the reconstructed digest. This reduces the amount of bandwidth sent between the server system and client device by allowing the client device 110 to directly download the media content from CDN 108 or backend 106, store the media content at the client, and send a digest (e.g., that has a smaller data size than the original media content) to the server system 102 such that the third-party application 105 executes without awareness that the VCVM 104 is separate from client device 110. Because client device 110 does not have to download or execute third-party application, client device 110 may be a "thin-client" that has limited processing power and/or memory.

In some embodiments, the third-party application 105 is a video-conferencing application that supports multi-directional video calling (e.g., between a plurality of client devices). In some embodiments, an incoming media stream for display at client device 110 comprises a continuous video stream (e.g., received via third-party backend 106) from a second client device 110-2. For example, instead of the media asset being stored as a plurality of segments in a CDN, the media asset comprises a continuous stream, and a digest is generated for the continuous stream (e.g., instead of a digest segment being generated in accordance with a full segment being received at the client device). Accordingly, as referred to herein, the "original segment" comprises a media stream of a video-conferencing application that generated a digest segment in real-time and transmits the digest to the server system in real-time. Additionally, in some embodiments, client device 110 does not wait for a playback command from the server system 102 before decoding and displaying the incoming media stream. In some embodiments, the client device 110 includes a microphone and/or camera (e.g., and the server system 102 includes a virtualized microphone and/or a virtualized camera).

In some embodiments, third-party application 105 retrieves content from a third-party backend 106, which forwards video data from a second client device 110-2 (e.g., a camera feed of a second client device and audio data from a microphone of the second client device). In some embodiments, the client device 110 (e.g., the first client device) receives the video and/or audio data (e.g., also referred to as a media stream) from third-party backend 106 and generates (e.g., in real-time) a digest of the video content (e.g., and/or a digest of audio content) to send to the third-party application 105, where the server system reconstructs the digest segment of the video and/or audio content into reconstructed media content, the third-party application determines GPU instructions for displaying an overlay and/or other decoding instructions for the video and/or audio retrieved from the camera and/or microphone of the second client device, and sends the GPU instructions to the first client device.

In some embodiments, as described with reference to FIG. 5A, the third-party application 105 receives, at the virtualized camera, a signal (e.g., and/or prerecorded video that is selected based on the signal) corresponding to video data (and/or audio data) collected from the physical camera of a first client device 110 (e.g., without receiving the actual video data from the physical camera feed), wherein the signal includes information about the camera data (e.g., whether there is movement in the image recorded by the camera, if the camera is on or off, etc.). In some embodiments, in accordance with the signal received from the first client device 110, the third-party application 105 receives (using the virtualized camera and/or virtualized microphone) a prerecorded (e.g., predetermined) video (e.g., video signal) that corresponds to the signal, instead of receiving the actual video data recorded by the physical camera of the client device 110. The third-party application 105 encodes the prerecorded video and outputs the encoded video. The server system (e.g., video analyzer 514) analyzes the encoded video output by the application 105 and determines properties of the encoded video (e.g., properties of the encoding). The server system then sends an adjustment command (e.g., an encoding instruction) to the client device 110 to perform the encoding according to the properties (e.g., the video to be output from the client via video out 529 to third-party backend 106). In some embodiments, a second client device 110-2 (e.g., where the first client device and the second client device are communicating via video conference) retrieves the encoded video from third-party backend 106. In some embodiments, the same method is performed for audio data retrieved from a physical microphone of the first client device to be played back on speakers of the second client device that is participating in the video conference.

Figure 2:
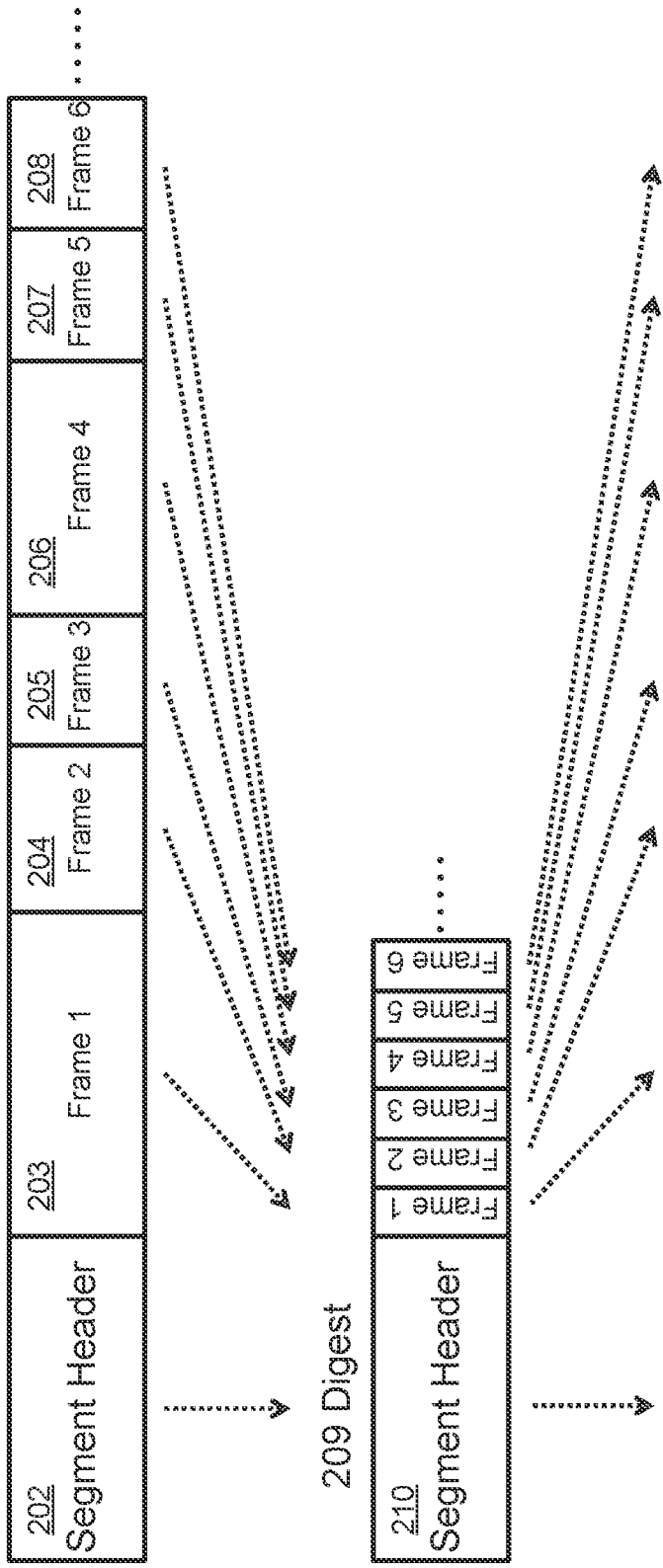
FIG. 2 is a diagram that illustrates the transformation of a video segment into a digest segment and its reconstruction into a reconstructed segment, in accordance with some embodiments.

FIG. 2 illustrates an example of generation of a digest 209 and a reconstructed segment 211. In some embodiments, a video stream comprises a plurality of media stream segments. The media stream segments are stored at CDN 108. In some embodiments, original segment 201 is obtained by client device 110. For example, client device 110 retrieves original segment 201 from the third-party CDN 108 (e.g., in response to the client receiving a command to retrieve the original segment 201).

Original Segment 201 depicts a hypothetical segment, such as an ISO base-media file-format (BMFF) segment as used in MPEG-dynamic-adaptive-streaming over HTTP (MPEG-DASH). Such a segment comprises a segment header 202 (e.g., which also corresponds to segment headers 210 and 212) and several frames, in this example, 203 to 208. It should be appreciated that the bulk of the segment data typically is the DRM-protected frame data. In some embodiments, the digest segment of the segment 209 is formed by removing the DRM-protected frame data and only including in the digest segment 209 the unmodified segment header (e.g., segment header 210 corresponds to unmodified segment header 202) and/or frame headers (such as picture headers and slice headers), including any codec specific headers, such as sequence headers, that are required to make an accurate reconstruction of the sequence of frames into reconstructed segment 211.

In some embodiments, after client device 110 receives original segment 201 (e.g., from CDN 108, or via video input 531), the client device 110 stores the original segment (e.g., in a buffer of the client device 110). In some embodiments, the client device 110 generates digest segment 209 and sends the digest segment 209 to server system 102. The server system 102 reconstructs the digest segment 209 into reconstructed segment 211 and provides reconstructed segment 211 to third-party application 105. Upon receiving reconstructed segment 211, third-party application 105 processes the reconstructed segment 211 (e.g., as if third-party application 105 had received original segment 201) and generates a playback command (e.g., a playback command that references and/or identifies original segment 201). The server system 102 sends the playback command to client device 110. In response to receiving the playback command, client device 110 initiates playback of original segment 201. In some embodiments, this process is repeated for each media stream segment that the client retrieves from CDN 108.

In some embodiments, instead of the client device 110 generating digest segment 209, client device forwards original segment 201 to server system 102 (e.g., and/or third-party CDN 108 sends original segment 201 directly to server system 102), and the server system generates digest segment 209 (e.g., and stores the digest segment 209 in a cache at the server system). Then, in some embodiments, in response to a second client device requesting playback for the same media asset, the server system 102 retrieves the digest segment for the requested media segment, reconstructs the digest segment, and provides the reconstructed segment to the third-party application 105 (e.g., that corresponds to a user session of the second client device).

Figure 3:
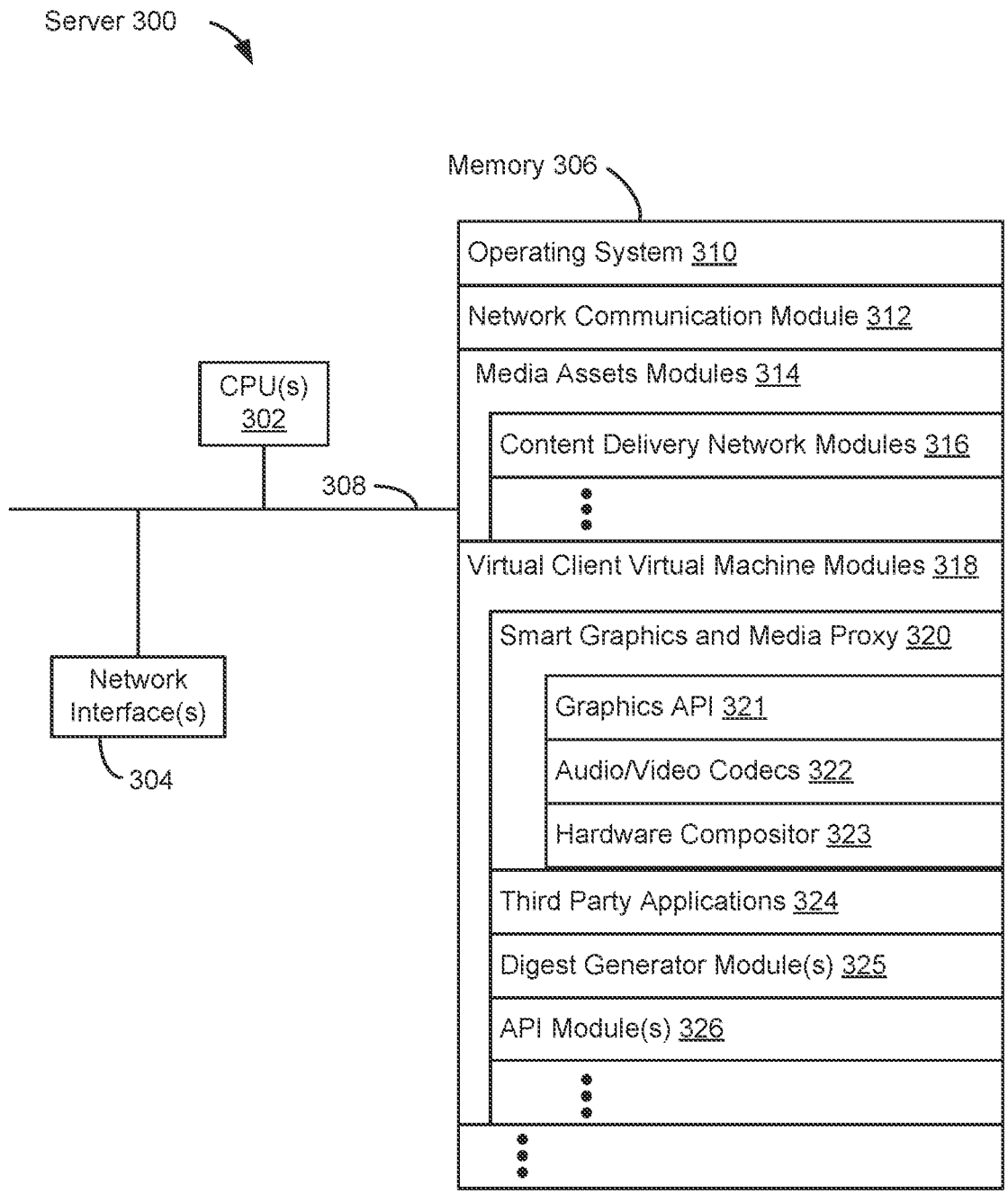
FIG. 3 is a block diagram of a server system, in accordance with some embodiments.

FIG. 3 is a block diagram illustrating an exemplary server computer system 300 in accordance with some implementations. In some embodiments, server computer system 300 is an application server system (e.g., server system 102) that executes virtual client virtual machine 104. The server computer system 300 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306, optionally, includes one or more storage devices remotely located from one or more CPUs 302. Memory 306, or, alternatively, the non-volatile solid-state memory device(s) within memory 306, includes a non-transitory computer-readable storage medium. In some implementations, memory 306, or the non-transitory computer-readable storage medium of memory 306, stores the following programs, modules and data structures, or a subset or superset thereof:

- an operating system 310 that includes procedures for handling various basic system services and for performing hardware dependent tasks;
- a network communication module 312 that is used for connecting the server computer system 300 to other computing devices via one or more network interfaces 304 (wired or wireless) connected to one or more networks such as the Internet, other WANs, LANs, PANs, MANs, VPNs, peer-to-peer networks, content delivery networks, ad-hoc connections, and so on;
- one or more media assets modules 314 for enabling the server computer system 300 to perform various functions, the media assets modules 314 including, but not limited to:
  - content delivery network modules 316 for retrieving and/or processing media content received, for example, from CDN 108;
- one or more virtual client virtual machine modules 318 for executing one or more VCVM(s) 104; in some implementations, the one or more virtual client virtual machine modules 318 include:
  - smart graphics and media proxy 320 (also referred to herein as network proxy) for tracking graphical states of client devices and/or processing graphics content, including one or more of:
    - graphics API 321 for generating and/or sending GPU overlay instructions (e.g., openGL primitives) to a client device;
    - audio/video codecs 322 for determining and/or sending playback commands to a client device;
    - hardware compositor 323 (e.g., a virtualized hardware compositor) for generating and/or sending compositing instructions to a client device;
  - third-party applications 324 for execution on the VCVM(s) 104 (e.g., applications 324 include third-party applications as described above);
  - digest generator module(s) 325 for generating digest segments (e.g., video and/or audio digest segments) based on media stream segments; and
  - API module(s) 326 for calling and/or using APIs, including for example, a Network API and an API of the third-party application (e.g., media playback API) to process playback of the media streams and/or digest segments.

In some implementations, the server computer system 300 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Although FIG. 3 illustrates the server computer system 300 in accordance with some implementations, FIG. 3 is intended more as a functional description of the various features that may be present in one or more media content servers than as a structural schematic of the implementations described herein. In practice, items shown separately could be combined and some items could be separated. For example, some items shown separately in FIG. 3 could be implemented on single servers and single items could be implemented by one or more servers. The actual number of servers used to implement server computer system 300, and how features are allocated among them, will vary from one implementation to another and, optionally, depends in part on the amount of data traffic that the server system handles during peak usage periods as well as during average usage periods.

Figure 4:
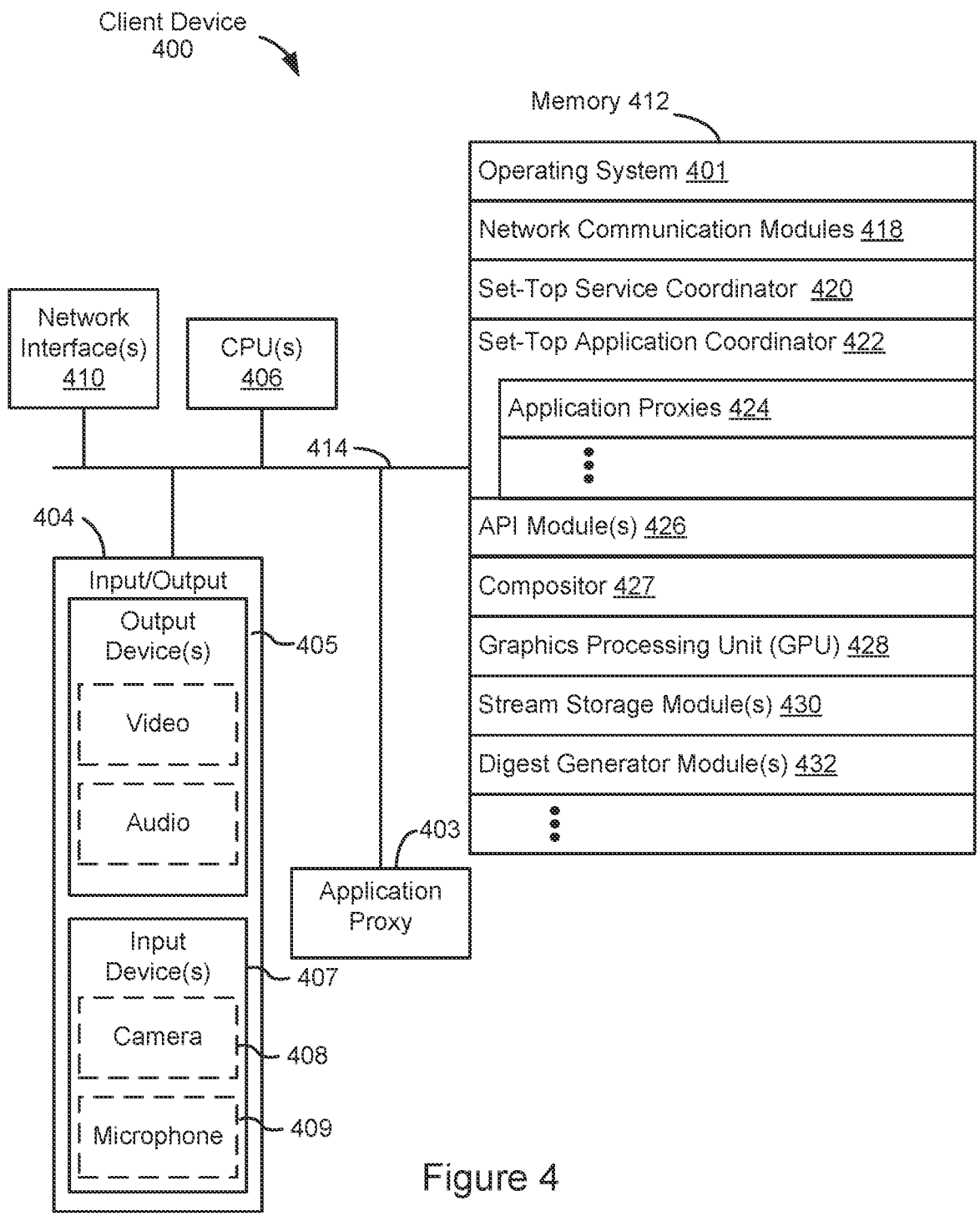
FIG. 4 is a block diagram of a client device, in accordance with some embodiments.

FIG. 4 is a block diagram illustrating an exemplary client device 400 (e.g., client device 110 of FIG. 1) in accordance with some implementations. The client device 400 typically includes one or more central processing units (CPU(s), e.g., processors or cores) 406, one or more network (or other communications) interfaces 410, memory 412, and one or more communication buses 414 for interconnecting these components. The communication buses 414 optionally include circuitry (sometimes called a chipset) that interconnects and controls communications between system components.

The client device includes input/output module 404, including output device(s) 405, such as video output and audio output, and input device(s) 407. In some implementations, the input devices 407 include a camera 408 (e.g., for video input) and/or microphone 409 (e.g., for audio input). In some implementations, the input devices 407 include a keyboard, a remote controller, or a track pad. For example, output device 405 is used for outputting video and/or audio content (e.g., to be reproduced by one or more displays and/or loudspeakers coupled with client device 400) and/or input device 407 is used for receiving user input (e.g., from a component of client device 400 (e.g., camera, microphone, keyboard, mouse, and/or touchscreen) and/or a control coupled to client device 400 (e.g., a remote control)). Alternatively, or in addition, the client device includes (e.g., is coupled to) a display device (e.g., to display video output).

The client device includes application proxy 403 for communicating with third-party applications that are executing on the server system. For example, taken together, server-side proxy (e.g., network proxy 320) and client-side proxy (e.g., application proxy 403) comprise an HTTP(S) proxy. For example, instead of storing and executing the application(s) on the client device, application proxy 403 receives commands (e.g., from a virtual machine in the server system) and, based on the received commands, instructs the client device to update the display accordingly. In some embodiments, application proxy 403 is not application-specific (e.g., application proxy 403 is generic for a plurality of applications).

In some implementations, the one or more network interfaces 410 include wireless and/or wired interfaces for receiving data from and/or transmitting data to other client devices 400, a server computer system 300, and/or other devices or systems. In some implementations, data communications are carried out using any of a variety of custom or standard wired protocols (e.g., USB, Firewire, Ethernet, etc.).

Memory 412 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 412 may optionally include one or more storage devices remotely located from the CPU(s) 406. Memory 412, or alternately, the non-volatile memory solid-state storage devices within memory 412, includes a non-transitory computer-readable storage medium. In some implementations, memory 412 or the non-transitory computer-readable storage medium of memory 412 stores the following programs, modules, and data structures, or a subset or superset thereof:
- an operating system 401 that includes procedures for handling various basic system services and for performing hardware dependent tasks;
- network communication module(s) 418 for connecting the client device 400 to other computing devices (e.g., client devices 110, server computer system 300, and/or other devices) via the one or more network interface(s) 410 (wired or wireless);
- a set-top service coordinator 420 for communicating with an operator data center, such as an orchestrator for handling content services provided to the client device (e.g., set-top box);
- a set-top application coordinator 422 for managing a plurality of third-party applications executing at the server system, the set-top application coordinator having additional module(s), including but not limited to:
  one or more application proxies 424 for communicating (e.g., graphical states) with third-party applications;
- API Module(s) 426 for managing a variety of APIs, including, for example, OpenGL and/or OpenMAX;
- Graphics Processing Unit (GPU) 428 for rendering graphical content, including frame buffering and display control;
- stream storage module(s) 430 (e.g., including one or more buffers) for storing original media content (e.g., from CDN 108), such as storing an original segment of a video stream; and
- digest generator module(s) 432 for generating respective digest segments for respective media stream segments (e.g., including video content and/or audio contented received by a camera and/or microphone) and sending the digest segments to the server system.

Features of the present invention can be implemented in, using, or with the assistance of a computer program product, such as a storage medium (media) or computer readable storage medium (media) having instructions stored thereon/in which can be used to program a processing system to perform any of the features presented herein. The storage medium (e.g., the memory 306 and the memory 412) can include, but is not limited to, high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. In some embodiments, the memory 306 and the memory 412 include one or more storage devices remotely located from the CPU(s) 302 and 406. The memory 306 and the memory 412, or alternatively the non-volatile memory device(s) within these memories, comprises a non-transitory computer readable storage medium.

Figure 5A:
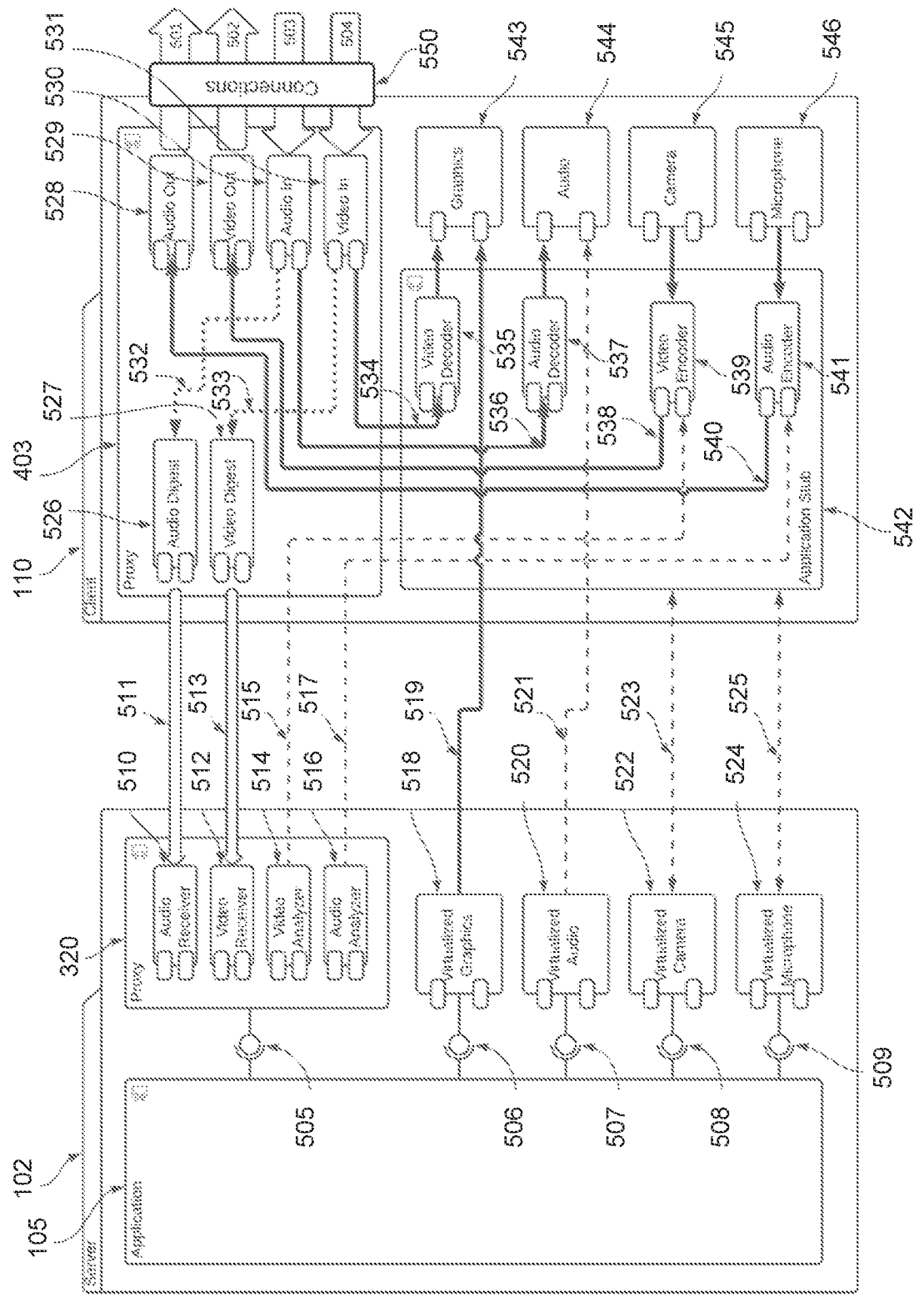
FIGS. 5A-5C are block diagrams of a video-conferencing application executing at a server system and a client device processing audio and video data for the application, in accordance with some embodiments.
Figure 5B:
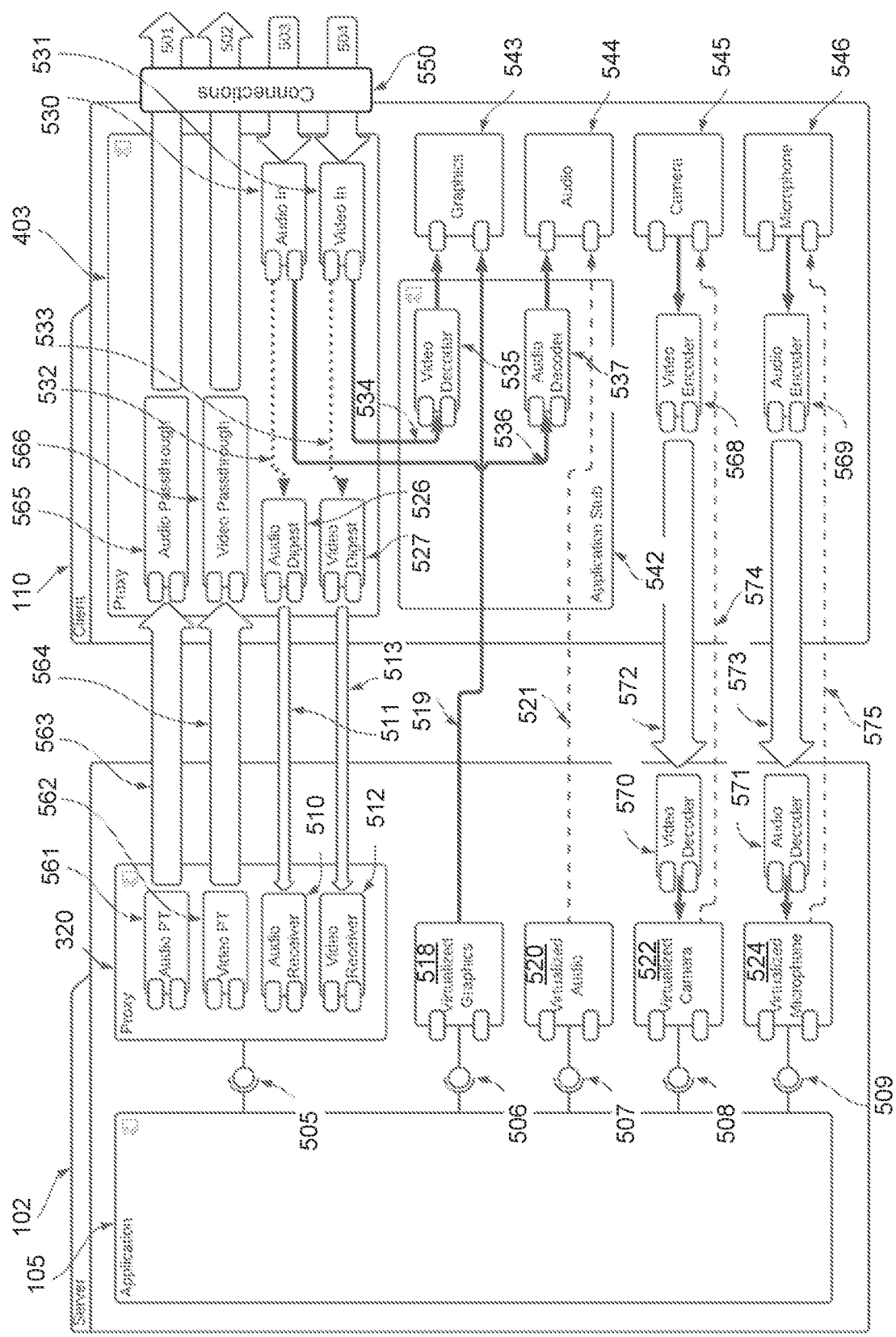
Figure 5C:
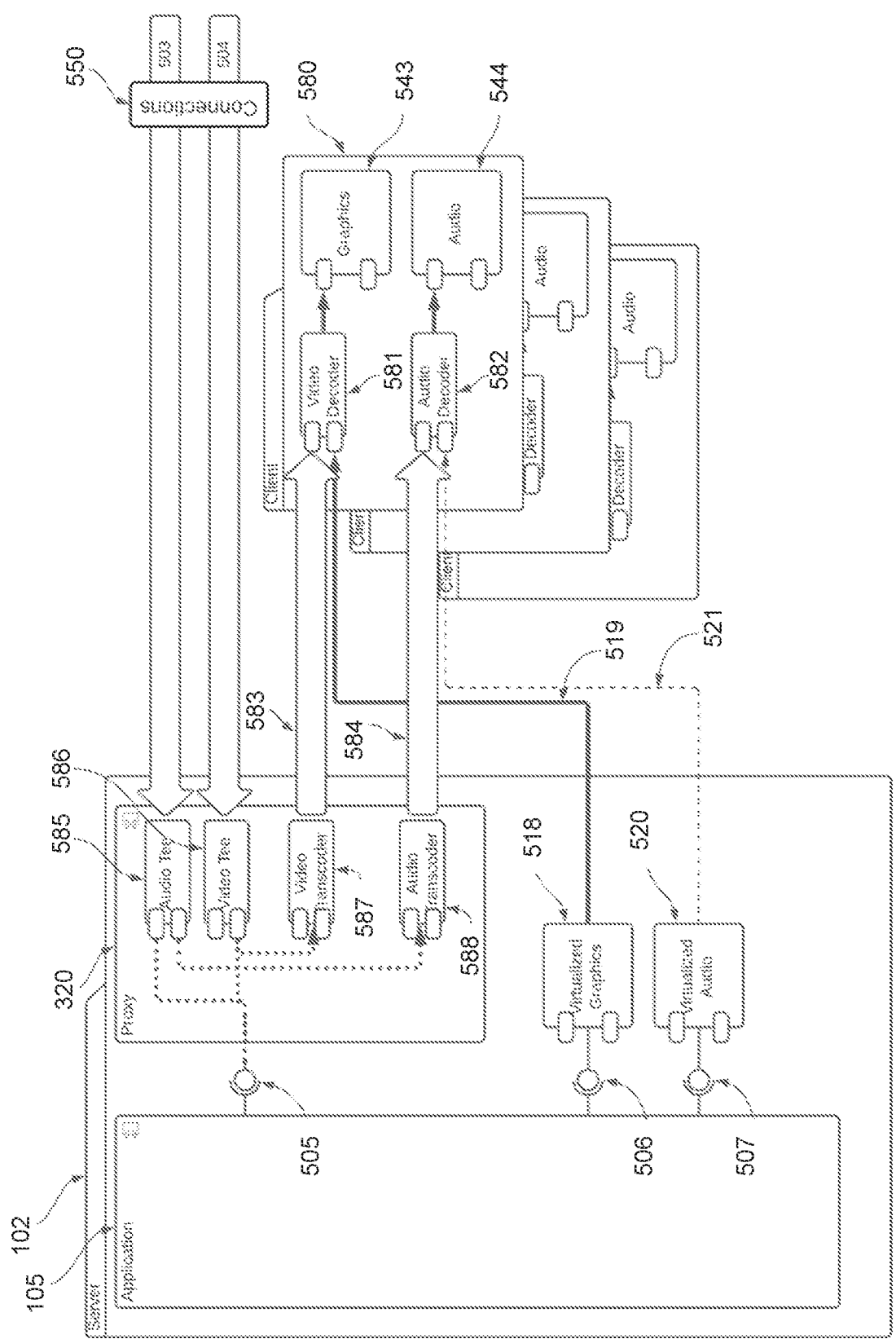

FIGS. 5A-5C illustrate block diagrams of a videoconferencing application executing at a server system for display at a client device.

FIG. 5A illustrates a third-party application 105 executing at a server 102 that is in communication with physical client device 110. In some embodiments, third-party application 105 is a video-conferencing application. When third-party application 105 is a video-conferencing application, client device must both decode incoming audio and video data (e.g., incoming from the other user(s) with which the client device is video-conferencing), as well as encode outgoing audio and video data (e.g., outgoing from client device 110, such as video data recorded by a camera of client device 110 and audio data recorded by a microphone of client device 110). Because the application 105 is executing on the server system 102 (e.g., and not locally on client device 110), there is a need for performing the decoding and encoding processes that are typically controlled by application 105 at a remote client device, as described in more detail below.

Decoding Processes

In some embodiments, third-party application 105 is a virtualized video-conferencing application. In some embodiments, third-party application 105 is an unmodified version of a video-conferencing application that executes at server system 102 instead of at a client device 110 (e.g., unmodified as compared to a version of third-party application 105 that would normally run on a client device). Because the application 105 is unmodified, the application 105 expects certain inputs and/or feedback as the application 105 is running). In some embodiments, third-party application 105 is modified to be executed at the server system, such that the modified version of the third-party application 105 does not expect to receive the same inputs as the unmodified version. For example, an unmodified version of application 105 performs checks (e.g., software decodes) on video input data (e.g., as reconstructed by video receiver 512), and thus the video digest 513 must be reconstructed using real video data to produce a fully compliant video stream (e.g., a pseudo-video stream with black images), whereas a modified version of application 105 may not perform these checks (e.g., software decodes) such that the reconstructed digest segment can be filled with dummy data (e.g., filled with 0s). Similarly, the reconstructed audio segment (e.g., reconstructed from audio digest 511) is reconstructed into a fully compliant stream or reconstructed with dummy data, depending on whether the application 105 is modified to execute at server system 102 (e.g., and depending on the inputs expected by the application 105).

In some embodiments, the video input 504 and the audio input 503 are received at client-side application proxy 403, from third-party application backend 106 and/or from a second client device (e.g., client device 110-2). For example, the video input 504 corresponds to the video feed of a camera of client device 110-2 and the audio input 503 corresponds to audio input from a microphone of client device 110-2 during a video conference.

In some embodiments, application proxy 403 includes video-in filter 531 to convert the incoming (encapsulated) video stream 504 (e.g., from third-party backend 106) into a video elementary stream and to add metadata to the incoming video stream, which the video-in filter 531 outputs as stream and metadata 533 (e.g., wherein the metadata includes information used by the video digest generator 527 to determine which data may be stripped from the video elementary stream). In some embodiments, application proxy 403 includes audio-in filter 530 to convert an incoming (encapsulated) audio stream 503 (e.g., from third-party backend 106) into an audio elementary stream and to add metadata to the audio stream, which the audio-in filter 530 outputs as audio stream and metadata 532 (e.g., wherein the metadata includes information used by the audio digest generator 526 to determine which data may be stripped from the audio elementary stream). In some embodiments, the video elementary stream 534 is sent to video decoder 535, (which decodes the encoded video elementary stream into a raw video stream) and the video elementary stream and metadata 533 is sent to video digest generator 527. In some embodiments, the audio elementary stream (e.g., audio stream 536) is sent to audio decoder 537 (which decodes the encoded audio elementary stream into a raw audio stream), and, the audio elementary stream and metadata 532 is sent to audio digest generator 526.

In some embodiments, server system 102 includes a smart graphics and media proxy 320. In some embodiments, smart graphics and media proxy 320 acts as a network proxy that includes an audio receiver 510 and a video receiver 512, for processing the digest segments received from the client device 110 before providing third-party application 105 with the processed digest segments (e.g., the reconstructed segments). Smart graphics and media proxy 320 communicates with third-party application 105 via network API 505 (e.g., the IP/UDP/TCP network API for the server system 102's virtualized operating system).

In some embodiments, audio receiver 510 converts an audio digest (e.g., audio digest 511, which only includes headers and is stripped of elementary stream data) to a full audio stream (e.g., where elementary stream data is replaced by placeholder, or "dummy", audio data), and video receiver 512 converts a video digest (e.g., video digest 513 received from client device 110) into a full video stream (e.g., where elementary stream data is replaced by placeholder, or "dummy", video data). For example, as described with reference to FIG. 1, client device 110 generates audio digests (e.g., using audio digest generator 526) and/or video digests (e.g., using video digest generator 527) that correspond to audio inputs 503 and video inputs 504, respectively, such that only the audio digest and/or video digest is transmitted to the server system (e.g., without sending the actual audio and/or video data).

Accordingly, network proxy 320 (e.g., smart graphics and media proxy 320) at the server system 102 receives the digests generated by audio digest generator 526 and/or video digest generator 527 and converts the digests into full streams to pass to the third-party application 105 (e.g., such that third-party application 105 receives reconstructed audio and/or video streams having a format and/or length that is expected by the third-party application 105).

In some embodiments, the reconstructed video digest is used by the application 105 to analyze properties of transmission of the video stream. For example, the application 105 determines whether to change a bit rate (e.g., or update other properties of transmission) based on the reconstructed video digest.

In some embodiments, the reconstructed video digest (e.g., reconstructed into a full video stream) is used by the application 105 to determine graphics that are to be overlaid with the video stream. For example, in some embodiments, server system 102 sends a stream of GPU instructions 519 to the client device, wherein the GPU instructions 519 reference respective video frames. In some embodiments, GPU instructions 519 include instructions (to the client device 110) for drawing one or more overlays and/or instructions for compositing the video data with one or more graphics (e.g., overlays). For example, video input 531 of the client device passes the video stream 534 to video decoder 535, which is decoded and combined with graphics using graphics facility (e.g., GPU) 543. For example, graphics facility 543 executes GPU instructions 519, received from the server, and combines the instructions with the signal decoded by video decoder 535. The decoded video with overlaid graphics is then displayed at the client device.

In some embodiments, the GPU instructions 519 correspond to instructions for drawing graphics, determined by application 105, that are to be displayed with the video content. For example, the third-party application 105 determines when certain animations, such as highlighting a current speaker, or other notifications, such as a text prompt indicating that a user is on mute, is the host, or an identifier of the user (e.g., the user's name is displayed along with the video captured by camera 545). In some embodiments, one or more graphics are determined by third-party application 105 in response to a respective stimulus. For example, the third-party application 105 receives a stimulus (e.g., an indication) that indicates a current speaker, and, in accordance with the stimulus, generates a graphic (e.g., a colored outline or other overlay) to be superimposed over the displayed video stream corresponding to the current speaker. In some embodiments, the third-party application 105 communicates via Graphics API 506 (e.g., the server's virtualized operating system's graphics API, such as OpenGL) the virtualized GPU 518 (e.g., which emulates the function of a GPU by sending GPU instructions to the graphics facility 543 at client device 110, which executes GPU instructions 519 and combines the graphics with the signal decoded by video decoder 535.

Similarly, the full audio stream 503 is received at audio input 530 at the client device and the stream 536 is passed to audio decoder 537, which is combined with virtualized audio 521. In some embodiments, server system 102 includes virtualized audio device 520, which emulates the function of a physical audio facility (e.g., audio facility 544) and provides an audio API 507 that discards decoded audio and detects audio volume. For example, physical client device 110 includes an audio facility 544 that plays the audio signal as decoded by the audio decoder 537 (e.g., with volume as detected by the virtualized audio device 520).

In some embodiments, the client device forgoes generating and/or transmitting audio digest 511 to the server system 102. For example, instead of sending audio digest 511 that represents the audio input 503, a signal of audio is transmitted to the server system. For example, audio receiver 510 receives the signal of audio and selects a prerecorded (e.g., fake) audio stream to provide to application 105. As such, application 105 still receives an audio stream (e.g., as application 105 expects), but the audio stream is not generated from a digest corresponding to the audio input 503. In some embodiments, by only transmitting a signal of audio instead of an audio digest reduces the amount of bandwidth used while still providing the application 105 with an audio input. Similarly, in some embodiments, the client device forgoes generating and/or transmitting video digest 513 to the server system and instead sends a signal of video (e.g., selected based on the incoming video stream), where video receiver 512 selects a prerecorded video stream to provide to application 105.

Encoding Processes

In some embodiments, the application 105 performs real-time adjustments to the processing of video and/or audio data based on latency. For example, the application 105 performs scalable video coding to generate multiple layers of a single video stream such that during low-latency periods, different layers of the video stream are dropped (e.g., to degrade the video quality). Because the application 105 performs these adjustments based on real-time conditions, the application 105 needs a fully compliant video stream to determine which layers of the video stream to drop during the encoding.

As described below, once the application makes the determination (e.g., using logic that is internal to the application), the application 105 outputs an encoded video stream and an encoded audio stream, where video analyzer 514 and audio analyzer 516 analyze the properties of the output video and audio streams as encoded by the application 105. The video analyzer 514 and audio analyzer 516 then send instructions to the client device such that the video encoder 539 and the audio encoder 541 of the client device so that the client device knows how to configure (e.g., encode) the video data from camera 545 and the audio data from microphone 546 to have the same properties as the streams encoded by application 105. In some embodiments, audio encoder 541 encodes the raw audio stream received from microphone 546 into an encoded audio elementary stream 540 and video encoder 539 encodes the raw video stream received from camera 545 into an encoded video elementary stream 538. In some embodiments, the encoded video elementary stream 538 is a scalable video coding (SVC) elementary stream.

As such, the client device 110 is able to locally encode the video and audio data detected from the physical camera and microphone to have the properties of video and audio streams that would be encoded by the virtualized third-party application 105, without sending the actual video data and audio data to the server system. Accordingly, in some embodiments, the client device does not send the actual video data captured by camera 545 or the actual audio data captured by microphone 546. For example, sending the actual audio data captured by microphone 546 to the application 105 at the server system would create a noticeable delay to the user at client device 110 (e.g., because of the latency that results from sending the actual audio and/or video data to the server to be processed and then returned back to the client).

In some embodiments, client device 110 includes (e.g., and/or is communicatively coupled to) a physical camera 545 and/or a physical microphone 546. Physical camera 545 records video data representing the field of view of the physical camera 545, for example a first user's webcam capturing images of the first user during a video conference with at least one additional user (e.g., a second user). Microphone 546 records audio data representing audio detected from the first user (e.g., as the first user speaks during the video conference). In some embodiments, signals (e.g., signal 523 and signal 525) are generated and sent to the server system that represent video and/or audio data currently being captured at the client device. For example, the signal that includes information about a current state of the video and/or audio data (e.g., a light level, luminosity, head tracking parameters, head count, a volume level, etc.). For example, the signal includes any information about the image and/or sound (e.g., without sending the video and/or audio data itself) as captured by the physical client device.

In some embodiments, server system 102 includes virtualized camera 522 and/or virtualized microphone 524. For example, virtualized camera 522 emulates the function of a camera and provides a camera API 508 that, in response to a signal 523 of a video (e.g., a signal corresponding to the video detected by camera 545), provides a stimulus signal to application 105. In some embodiments, the video stimulus signal provided to the application 105 comprises a prerecorded picture that is selected based on input (e.g., signal 523) received from application stub 542 (e.g., if camera 545 records a still image, the stimulus comprises a previously-stored still image; if the camera records a vivid image, the stimulus comprises a previously-stored vivid image). For example, the server system includes a repository of prerecorded images (e.g., stimuli) and selects which image to provide to the application 105 based on the information in the signal received from the client device. In some embodiments, signal 523 is a signal that indicates whether physical camera 545 is on or off (e.g., whether the video camera has been disabled). In some embodiments, signal 523 includes information about light levels, luminosity, and any other properties of the image that is captured by camera 545.

Similarly, in some embodiments, virtualized microphone 524 emulates the function of a microphone and provides a microphone API 509 that, in response to a signal 525 of audio (e.g., a signal corresponding to the audio detected by microphone 546), provides a stimulus signal to application 105. In some embodiments, the audio stimulus signal provided to the application 105 comprises a prerecorded audio recording that is selected based on input (e.g., signal 525) received from application stub 542 (e.g., if microphone 546 records someone talking at a certain level, the stimulus comprises a previously-stored recording of someone talking; if the camera records silence (e.g., no audio above a threshold level), the stimulus comprises silence). For example, the server system includes a repository of prerecorded audio recordings (e.g., stimuli) and selects which audio recording to provide to the application 105 based on the information in the signal received from the client device. In some embodiments, the signal 525 of audio indicates an audio level and/or an audio type. In some embodiments, signal 525 is a signal that indicates whether physical microphone 546 is on or off (e.g., whether the microphone has been muted).

In response to receiving the stimulus (e.g., the prerecorded video recording and/or the prerecorded audio recording), application 105 encodes the prerecorded video recording and/or the prerecorded audio recording according to the internal settings of the application 105. For example, the application 105 determines how to encode the stimulus based on the current conditions indicated by the stimulus and/or bandwidth conditions (e.g., as determined based on the reconstructed digest audio and/or video streams, and/or as determined based on information received from third-party backend 106). Application 105 then outputs the encoded stimulus (e.g., as an encoded video stream and/or an encoded audio stream), as the application 105 would if it were executing on a client device instead of a server system. Video analyzer 514 and audio analyzer 516 intercept the encoded stimulus and analyze the properties of the encoded video and/or audio streams (e.g., as encoded by the application 105).

In some embodiments, video analyzer 514 analyzes a video stream that is encoded by third-party application 105 (e.g., to determine properties of the generated video stream, such as frame width, height, format, stream bitrate, scalable video codec layer configuration, etc.) and sends an instruction 515 to the video encoder 539 of client device 110 for adjusting the video that is detected by physical camera 545 of the client device 110. In some embodiments, camera 545 provides a raw image stream to video encoder 539. For example, the instruction 515 instructs the video encoder 539 to adjust the properties of the video detected by camera 545 to match the properties that were determined from the video stream generated by the third-party application. In this way, the client device 110 performs the video encoding with properties that match how the video stream would have been encoded by the third-party application 105 itself (e.g., if third-party application 105 executed at client device 110 instead of remotely at server system 102).

In some embodiments, audio analyzer 516 analyzes an audio stream that is generated by third-party application (e.g., to determine properties of the generated audio stream, such as number of channels, sample rate, depth, stream bitrate, etc.) and sends an instruction 517 to the audio encoder 541 of client device 110 for adjusting the audio that is detected by physical microphone 546 (e.g., to encode the audio to have the same properties as the audio stream generated by application 105 as determined by audio analyzer 516).

In some embodiments, video encoder 539, audio encoder 541, video decoder 535 and audio decoder 537 are loaded in an application stub 542 on client device 110. For example, application stub 542 is an application-specific software module for performing the encoding/decoding at the client device (e.g., where the third-party application 105 is not running on the client device to perform its own encoding/decoding). In some embodiments, application stub 542 corresponds to components of the third-party application 105 and is loaded onto the client device 110 in response to a request (e.g., by the client device 110) to launch application 105. For example, instead of locally executing application 105, application stub 542 is sent (e.g., to open a session with the application). In some embodiments, application stub 542 is turned on in the background (e.g., a user of client device 110 is unaware of application stub 542). Application stub 542 typically requires far fewer resources than third-party application 502, and thus allows "thin" client devices, that would otherwise not be able to execute third-party application 502, to provide the same services through virtualization of third-party application 502

The video data detected by physical camera 545 is passed to video encoder 539, where video encoder 539 processes (e.g., encodes) the video according to the video instruction 515 (e.g., also referred to as a video encoder configuration stream) received from the server system 102. In some embodiments, the video instruction 515 includes instructions for configuring and updating the video encoder 539 of the client device 110 to include video properties as detected by the video analyzer 514 such that the video stream encoded by video encoder 539 will have the same properties as the video encoded by application 105 (e.g., wherein video analyzer 514 determines the properties of the video stream output by application 105). For example, video encoder 539 encodes the video at the client device 110 to have the same properties as a video stream generated by third-party application 105 itself before outputting the encoded video stream 538 through video output 529, which encapsulates the encoded video (e.g., elementary stream) into a proper container format and sends the encapsulated video via outgoing video connection 502 (e.g., sent to the application backend 106 and/or to at least one additional user participating in the video conference).

In some embodiments, the audio data detected by microphone 546 is passed to audio encoder 541, which adjusts (e.g., encodes) the audio data to have the same properties as an audio stream generated by third-party application 105 (e.g., as determined by audio analyzer 516 and indicated by audio instruction 517). In some embodiments, the audio instruction 517 includes instructions for configuring and updating the audio encoder 541 of the client device 110 to apply audio properties as detected by the audio analyzer 516 such that the audio stream encoded by audio encoder 541 will have the same properties as the audio encoded by application 105 (e.g., wherein audio analyzer 516 determines the properties of the audio stream output by application 105). After encoding the audio data received from microphone 546 to have the properties determined by audio analyzer 516, the audio encoder 541 outputs the audio via audio output 528, which encapsulates the encoded audio (e.g., elementary stream) into a proper container format and sends the encapsulated audio via outgoing audio connection 501 (e.g., sent to the application backend 106 and/or to at least one additional user participating in the video conference).

In some embodiments, echo cancellation is performed by audio encoder 541. In some embodiments, a signal that the microphone is muted is sent to server system 102 and any audio data detected by the microphone are not forwarded to the server system as a signal corresponding to the audio data while the microphone is muted. For example, in response to a user hitting a "mute" icon or otherwise instructing the client device 110 to disable microphone 546, a signal 525 is sent to virtualized microphone 524 indicating that the microphone is muted, which is passed via API 509 (e.g., an API of third-party application 105).

It will be understood that the streams illustrated in FIG. 5A that pass through connections 550 (e.g., the streams that are sent to and from the application backend 106 (e.g., streams 501-504)) may be individual streams for audio/video in and audio/video out, or otherwise combined in any other configuration (e.g., not necessarily as 4 distinct streams). In some embodiments, the streams are encapsulated in a container format. In some embodiments, the streams are transmitted as elementary streams over a protocol run over TCP, RTP or UDP.

FIGS. 5B-5C illustrate block diagrams for conducting a webinar using third-party application 105. For example, FIG. 5C illustrates that a same transcode is used for a plurality of client devices. While it is typically more expensive to perform transcoding at the server system instead of locally on the client device, during a webinar, typically, a plurality of client devices receive a same video and audio stream (e.g., that is being presented during the webinar), such that audio and/or video data need only be transcoded at the server system one time and distributed to a plurality of client devices. In some embodiments, during a webinar, the client device(s) only receive audio and/or video data (e.g., without a return path), in accordance with the webinar being unidirectional (e.g., only the presenter provides audio and/or video data).

For example, FIG. 5B illustrates the server system 102 that includes network proxy 320, which includes audio passthrough 561 for passing-through the encoded audio stream 563 (e.g., unmodified, as encoded by the third-party application 105) to the audio passthrough 565 of the client device 110 (e.g., which also passes-through the encoded audio stream unmodified, as audio stream 501, to the application backend 106). In some embodiments, network proxy 320 further includes video passthrough 562 for passing-through the encoded video stream 564 (e.g., unmodified, as encoded by the third-party application 105) to the video passthrough 566 of the client device 110 (e.g., which also passes-through the encoded video stream unmodified, as video stream 502, to the application backend 106).

FIG. 5B further illustrates that the server system includes video decoder 570 for decoding a video stream 572 that is detected by camera 545 of the client device 110, wherein video encoder 568 encodes the video data detected by camera 545 into video stream 572. In some embodiments, video stream 572 is a raw video stream that is directly passed to virtualized camera 522 (e.g., unlike in FIG. 5A, in which a signal of the video stream or a prerecorded video stream is provided to the virtualized microphone instead of the video stream from the camera). In some embodiments, virtualized camera 522 sends a camera configuration stream 574 to client device 110 (e.g., the camera 545 of client device 110) to signal to the camera to turn on or off (e.g., as instructed by application 105). For example, application 105 controls (e.g., via signal 523) whether the physical camera 545 is turned on or off.

The server system also includes audio decoder 571, which decodes the audio stream 573 received from the client device 110 (e.g., as detected by microphone 546), wherein audio encoder 569 encodes the audio data detected by microphone 546 into audio stream 573. In some embodiments, audio stream 573 is a raw audio stream that is directly passed to virtualized microphone 524 (e.g., unlike in FIG. 5A, in which a signal of the audio stream or a prerecorded audio stream is provided to the virtualized microphone instead of the audio stream from the microphone). In some embodiments, virtualized microphone 524 sends a microphone configuration stream 575 to client device 110 (e.g., the microphone 546 of client device 110) to signal to the microphone to turn on or off (e.g., as instructed by application 105).

FIG. 5C illustrates a client device 580, which is a client device that does not include an audio decoder and/or a video decoder capable of decoding incoming audio stream 503 and/or incoming video stream 504, as received from a backend of application 105 (e.g., a video-conferencing application). Accordingly, client device 580 includes a video decoder 581 and an audio decoder 582 that is unable to locally process the incoming audio and/or video streams, and thus must rely on the server system 102 to perform the decoding. In some embodiments, the server system 102 includes network proxy 320, which includes Audio Tee 585 for forwarding incoming audio stream 503 to the network API 505 (to communicate the audio stream 503 to application 105) and forwarding the incoming audio stream 503 to audio transcoder 588. In some embodiments, audio transcoder 588 transcodes the incoming audio stream 503 to an audio codec and container format that is compatible with (e.g., can be decoded by) the audio decoder 582 of the client device 110. The audio transcoder 588 sends the compatible stream 584 to audio decoder 582 of client device 580, where client device 580 decodes the compatible audio stream, processes the stream (e.g., adjusts the volume of the audio stream according to information in audio configuration stream 521) and outputs the audio stream using audio facility 544.

In some embodiments, the network proxy 320 also includes Video Tee 586 for forwarding the incoming video stream 504 to the network API 505 (to communicate the video stream 504 to application 105) and forwarding the incoming video stream 504 to video transcoder 587. In some embodiments, video transcoder 587 transcodes the incoming video stream 504 to a video codec and container format that is compatible with (e.g., can be decoded by) the video decoder 581 of client device 110. The video transcoder 587 sends the compatible stream 583 to the video decoder 581 to the client device 580, where client device 580 decodes the video stream, processes the stream (e.g., adding graphics 519) and outputs the processed stream for display using graphics facility 543.

Figure 6:
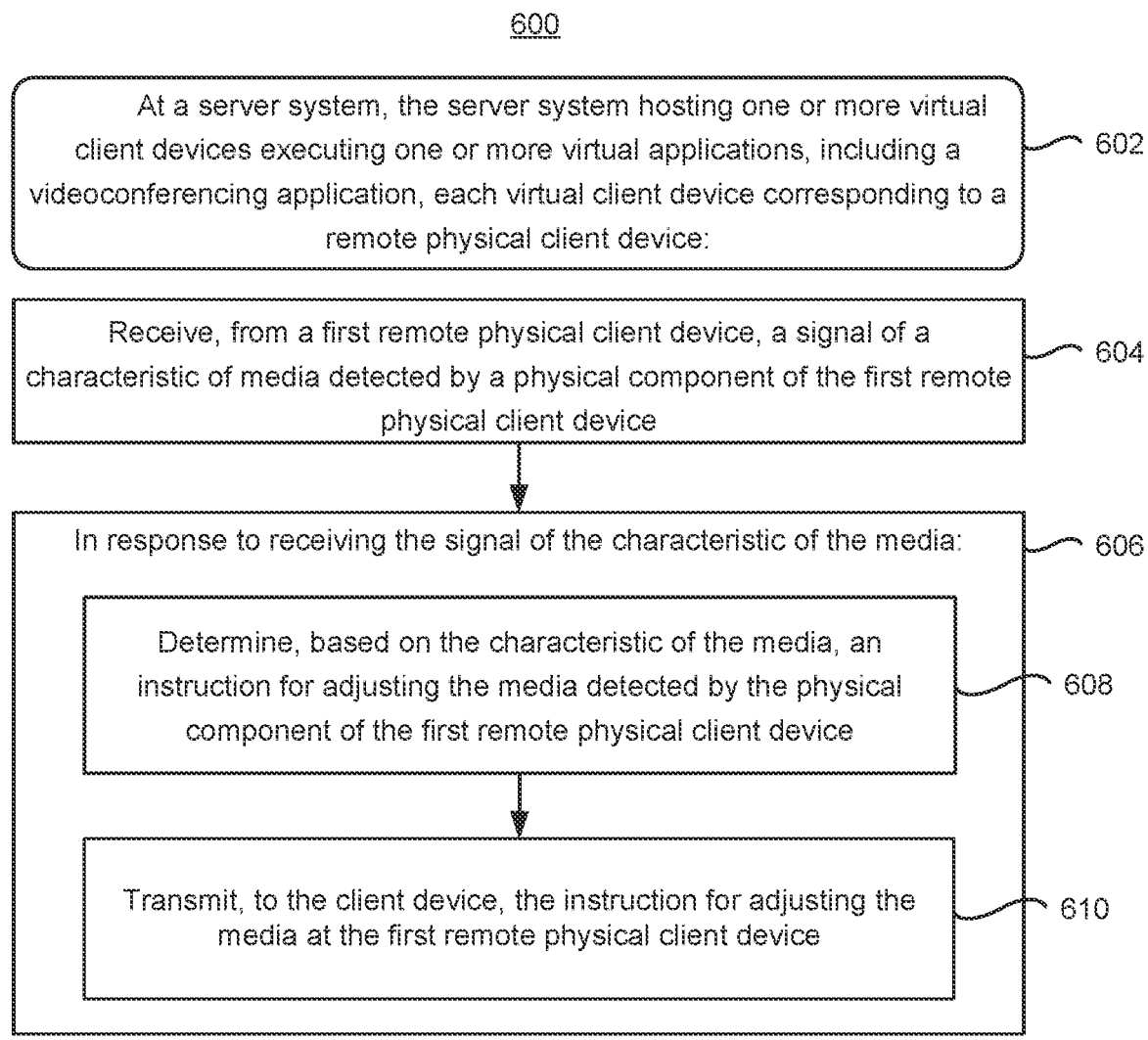
FIG. 6 is a flowchart for a method of a server system instructing a client device to adjust audio and/or video data for a video-conferencing application, in accordance with some embodiments.

FIG. 6 illustrates a method 600 for a server providing instructions to a client device to adjust media content received by the client device. In some embodiments, the method 600 is performed by a server computer system 300 that hosts (602) one or more virtual client devices (e.g., VCVMs) executing one or more virtual applications (e.g., application 105, such as a videoconferencing application and/or a teleconferencing application), each virtual client device corresponding to a remote physical client device, as shown in FIG. 1. For example, instructions for performing the method are stored in the memory 306 and executed by the processor(s) 302 of the server computer system 300. Some operations described with regard to the method 600 are, optionally, combined and/or the order of some operations is, optionally, changed. The server computer system (e.g., a server computing device) has one or more processors and memory storing one or more programs for execution by the one or more processors. In some embodiments, each physical client device is a thin client programmed to remote into a server-based computing environment.

In some embodiments, the server includes a virtualized microphone and/or a virtualized camera, as described with reference to FIG. 5A.

The server system receives (604), from a first remote physical client device, a signal of a characteristic of media detected (e.g., recorded) by a physical component of the first remote physical client device. For example, in FIG. 5A, signal 523 is received from application stub 542 of client device 110.

In some embodiments, the media detected by the physical component comprises one or more of audio detected by a physical microphone and video detected by a physical camera. For example, the media detected by the physical component is only audio. In some embodiments, the media detected by the physical component comprises audio detected by the physical microphone and the signal comprises an indication of an audio level (e.g., volume) detected by the physical microphone (e.g. microphone 546). In some embodiments, the signal does not include actual audio data that is detected by microphone 546 (e.g., the actual audio data is not sent to the server system). In some embodiments, the signal is received by the virtualized microphone 524 of the server system.

In response to receiving the signal of the characteristic of the media (606), the server system determines (608), based on the characteristic of the media, an instruction for adjusting (e.g., encoding) the media detected by the physical component of the first remote physical client device and transmits (610), to the client device, the instruction for adjusting the media at the first remote physical client device (e.g., in accordance with the characteristic). For example, as illustrated in FIG. 5A, the instruction is determined using audio analyzer 516 and is transmitted to audio encoder 541 at the client device.

In some embodiments, the media detected by the physical component comprises audio detected by the physical microphone and in response to receiving the signal of the characteristic of the audio, the server system provides a virtualized microphone, at the server system, with a stored audio recording that corresponds to the received signal of the characteristic of audio. For example, the stored audio recording is selected in accordance with the characteristic of the audio. In some embodiments, providing the stored audio recording comprises providing silence (e.g., in accordance with a determination that the characteristic of audio is silent).

In some embodiments, in response to receiving the signal of the characteristic of the audio, a first application (e.g., a video-conferencing application, application 105) of the one or more virtual applications encodes the stored audio recording with a first set of audio properties.

In some embodiments, determining the instruction for adjusting the audio detected by the physical microphone of the first remote physical client device comprises analyzing the first set of audio properties of the stored audio recording encoded by the first application. For example, the application 105 outputs an encoded audio stream, which is then analyzed by audio analyzer 516, described above with reference to FIG. 5A.

In some embodiments, the instruction sent to the client device (e.g., instruction 517) is an instruction for the client device to encode the audio detected by the physical microphone of the first remote physical client device according to the first set of audio properties.

In some embodiments, the first set of audio properties comprises one or more of a number of channels, a sample rate, a depth, and a bit rate.

In some embodiments, the signal of a characteristic of audio comprises an audio level of the audio detected by the physical microphone of the first remote physical client device.

In some embodiments, the media detected by the physical component comprises video detected by the physical camera and the server system receives, from the first remote physical client device, a signal of a characteristic of video detected by the physical camera of the first remote physical client device. In response to receiving the signal of the characteristic of the video, the server system determines, based on the characteristic of the video, an instruction for encoding the video detected by the physical camera of the first remote physical client device and transmits, to the client device, the instruction for adjusting the video at the first remote physical client device.

In some embodiments, in response to receiving the signal of the characteristic of the video, the server system provides a virtualized camera (e.g., virtualized camera 522), at the server system, with a stored video recording (e.g., or a stored image or other stimulus) that corresponds to the received signal of the characteristic of the video. For example, the stored video detected selected in accordance with the video characteristic (e.g., depending on whether motion was detected by the physical camera 545).

In some embodiments, in response to receiving the signal of the characteristic of the video, the first application of the one or more virtual applications encodes the stored video recording with a first set of video properties.

In some embodiments, determining the instruction for adjusting the video detected by the physical camera of the first remote physical client device comprises analyzing the first set of video properties of the stored video recording encoded by the first application. In some embodiments, the instruction is an instruction for the client device to encode the video detected by the physical camera of the first remote physical client device according to the first set of video properties.

In some embodiments, the first set of video properties comprises one or more of resolution, frame width, frame height, format, number of layers, and stream bit rate. In some embodiments, the first set of video properties further comprises head (e.g., and/or facial) tracking (e.g., indicating a number and/or location of individuals in the field of view of the camera).

In some embodiments, the signal of a characteristic of video comprises an amount of movement detected by the physical camera of the first remote physical client device.

In some embodiments, the server system further transmits, to the first remote physical client device, an instruction to transmit the media that has been adjusted. For example, the server system instructs the application stub to encode the audio and/or video according to the properties and to transmit (e.g., output) the encoded audio and/or video (e.g., to third-party backend 106). In some embodiments, the server system does not instruct the first remote physical client device to transmit the media that has been adjusted (e.g., the application stub automatically transmits the encoded audio and/or video after encoding the audio and/or video (or in response to a request from third-party backend 106)).

In some embodiments, the server system receives, from a respective remote physical client device, a digest of a segment of video content received by the respective remote physical client device, the segment of video content including a plurality of frames of video content. For example, the server system receives video digest 513 from client device 110, and in some embodiments, the server system reconstructs the video digest and determines GPU instructions (e.g., to overlay graphics) for frames of the reconstructed video segment.

In some embodiments, the server system receives, from the respective remote physical client device, a digest of a segment of audio content received by the respective remote physical client device, the segment of video content including a plurality of frames of video content. For example, audio digest 511 is sent from client device 110 to server system 102, as described with reference to FIG. 5A.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method for running a videoconferencing application at a server system comprising:
   at the server system, the server system hosting one or more virtual client devices executing one or more virtual applications, including the videoconferencing application, each virtual client device corresponding to a remote physical client device:
   receiving, from a first remote physical client device, a signal of a characteristic of media detected by a physical component of the first remote physical client device;
   receiving, from a respective remote physical client device, a digest of a segment of audio content received by the respective remote physical client device;
   after receiving the signal of the characteristic of the media and the digest of the segment of the audio content received by the respective remote physical client device:
   determining, based on the characteristic of the media or the digest of the segment of the audio content, one or more instructions for adjusting the media detected by the physical component of the first remote physical client device; and
   transmitting, to the first remote physical client device, the one or more instructions for adjusting the media at the first remote physical client device.

2. The method of claim 1, wherein the media detected by the physical component comprises one or more of audio detected by a physical microphone and video detected by a physical camera.

3. The method of claim 2, wherein:
   the media detected by the physical component comprises audio detected by the physical microphone, and
   the method further comprises, in response to receiving the signal of the characteristic of the audio, providing, to a virtualized microphone, at the server system, a stored audio recording that corresponds to the received signal of the characteristic of audio.

4. The method of claim 3, wherein, at the server system, in response to receiving the signal of the characteristic of the audio, a first application of the one or more virtual applications encodes the stored audio recording with a first set of audio properties.

5. The method of claim 4, wherein:
   determining the one or more instructions for adjusting the audio detected by the physical microphone of the first remote physical client device comprises analyzing the first set of audio properties of the stored audio recording encoded by the first application; and
   the one or more instructions includes an instruction for the first remote physical client device to encode the audio detected by the physical microphone of the first remote physical client device according to the first set of audio properties.

6. The method of claim 4, wherein the first set of audio properties comprises one or more of a number of channels, a sample rate, a depth, and a bit rate.

7. The method of claim 2, wherein the media detected by the physical component comprises audio detected by the physical microphone, and
the signal of a characteristic of audio comprises an audio level of the audio detected by the physical microphone of the first remote physical client device.

8. The method of claim 2, wherein the media detected by the physical component comprises video detected by the physical camera, and
the method further comprises:
receiving, from the first remote physical client device, a signal of a characteristic of video detected by a physical camera of the first remote physical client device;
in response to receiving the signal of the characteristic of the video:
determining, based on the characteristic of the video, an instruction for encoding the video detected by the physical camera of the first remote physical client device; and
transmitting, to the first remote physical client device, the instruction for adjusting the video at the first remote physical client device.

9. The method of claim 8, further comprising, in response to receiving the signal of the characteristic of the video, providing to a virtualized camera, at the server system, a stored video recording that corresponds to the received signal of the characteristic of the video.

10. The method of claim 9, wherein, at the server system, in response to receiving the signal of the characteristic of the video, a first application of the one or more virtual applications encodes the stored video recording with a first set of video properties.

11. The method of claim 10, wherein:
determining the instruction for adjusting the video detected by the physical camera of the first remote physical client device comprises analyzing the first set of video properties of the stored video recording encoded by the first application; and
the one or more instructions includes an instruction for the first remote physical client device to encode the video detected by the physical camera of the first remote physical client device according to the first set of video properties.

12. The method of claim 10, wherein the first set of video properties comprises one or more of resolution, frame width, frame height, format, number of layers, and stream bit rate.

13. The method of claim 2, wherein the media detected by the physical component comprises video detected by the physical camera, and the signal of a characteristic of video comprises an amount of movement detected by the physical camera of the first remote physical client device.

14. The method of claim 1, further comprising, transmitting, to the first remote physical client device, an instruction to transmit the media that has been adjusted.

15. The method of claim 1, further comprising, receiving, from the respective remote physical client device, a digest of a segment of video content received by the respective remote physical client device, the segment of video content including a plurality of frames of video content.

16. A computer readable storage medium storing one or more programs for execution by one or more processors of a server system hosting one or more virtual client devices, each virtual client device corresponding to a remote physical client device, the one or more programs including instructions for:
receiving, from a first remote physical client device, a signal of a characteristic of media detected by a physical component of the first remote physical client device;
receiving, from a respective remote physical client device, a digest of a segment of audio content received by the respective remote physical client device;
after receiving the signal of the characteristic of the media and the digest of the segment of the audio content received by the respective remote physical client device:
determining, based on the characteristic of the media or the digest of the segment of the audio content, one or more instructions for adjusting the media detected by the physical component of the first remote physical client device; and
transmitting, to the first remote physical client device, the one or more instructions for adjusting the media at the first remote physical client device.

17. A server system hosting one or more virtual client devices, each virtual client device corresponding to a remote physical client device, comprising:
one or more processors; and
memory storing one or more programs for execution by the one or more processors, the one or more programs including instructions for:
receiving, from a first remote physical client device, a signal of a characteristic of media detected by a physical component of the first remote physical client device;
receiving, from a respective remote physical client device, a digest of a segment of audio content received by the respective remote physical client device;
after receiving the signal of the characteristic of the media and the digest of the segment of the audio content received by the respective remote physical client device:
determining, based on the characteristic of the media or the digest of the segment of the audio content, one or more instructions for adjusting the media detected by the physical component of the first remote physical client device; and
transmitting, to the first remote physical client device, the one or more instructions for adjusting the media at the first remote physical client device.

* * * * *